(12) United States Patent
Novak et al.

(10) Patent No.: US 9,889,067 B2
(45) Date of Patent: *Feb. 13, 2018

(54) INTEGRAL EYEWASH AND FAUCET

(71) Applicant: Speakman Company, New Castle, DE (US)

(72) Inventors: Charles J. Novak, Wilmington, DE (US); Jeffrey B. Harwanko, Wilmington, DE (US)

(73) Assignee: Speakman Company, New Castle, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,232

(22) Filed: Sep. 29, 2016

(65) Prior Publication Data

US 2017/0014303 A1      Jan. 19, 2017

Related U.S. Application Data

(62) Division of application No. 13/870,130, filed on Apr. 25, 2013, now Pat. No. 9,492,348.

(60) Provisional application No. 61/638,861, filed on Apr. 26, 2012.

(51) Int. Cl.
    *A61H 35/02*      (2006.01)
    *F16K 11/00*      (2006.01)
    *E03C 1/04*      (2006.01)

(52) U.S. Cl.
    CPC ........... *A61H 35/02* (2013.01); *E03C 1/0404* (2013.01); *F16K 19/006* (2013.01)

(58) Field of Classification Search
    CPC .... A61H 35/02; F16K 19/006; E03C 2201/30
    USPC .... 4/619, 620, 624–626, 900, 678; 137/801, 137/597; 239/25
    See application file for complete search history.

(56) References Cited

U.S. PATENT DOCUMENTS

| | | |
|---|---|---|
| 1,096,406 A | 5/1912 | Tunnicliffe |
| 3,101,174 A | 8/1963 | Loveland |
| 3,925,829 A | 12/1975 | Bost |
| 4,585,175 A | 4/1986 | Formentos |
| 4,627,845 A | 12/1986 | De Motte |
| 4,675,924 A | 6/1987 | Allison et al. |
| 4,688,276 A | 8/1987 | Allison et al. |
| 5,170,518 A | 12/1992 | Warriner |
| 5,205,313 A | 4/1993 | Moretti |
| 5,350,112 A | 9/1994 | Stein |
| 6,029,699 A | 2/2000 | Granot |
| 6,385,794 B1 | 5/2002 | Miedzius et al. |
| D466,589 S | 12/2002 | Miedzius |

(Continued)

OTHER PUBLICATIONS

Speakman Company website product detail—SEF-1800-CA-8.

(Continued)

*Primary Examiner* — Erin Deery
(74) *Attorney, Agent, or Firm* — Potter Anderson and Corroon LLP

(57) ABSTRACT

An integrated columnar structure is connected to hot and cold water supplies. On the structure is separately mounted on eyewash and faucet. In an alternative embodiment a water bubbler can be substituted for the eyewash. Water passageways within the columnar structure separately supply the appropriate temperature water to the faucet and eyewash/bubbler. Valving mounted on the columnar structure, preferably with an angle oriented at an acute angle to the axis of the column, controls the temperature of water supplied to the faucet. Cold, or slightly tempered, water is supplied to the eyewash.

13 Claims, 13 Drawing Sheets

(56) References Cited

U.S. PATENT DOCUMENTS

| | | |
|---|---|---|
| 6,729,344 B1 | 5/2004 | Hung |
| 6,782,568 B2 | 8/2004 | Novak et al. |
| 7,013,921 B2 | 3/2006 | Bregoli |
| 7,090,144 B2 | 8/2006 | Gross et al. |
| 8,671,979 B2 | 3/2014 | Gioira et al. |
| 8,826,932 B2 | 9/2014 | Seal et al. |
| 2005/0151106 A1 | 7/2005 | He |
| 2006/0086394 A1 | 4/2006 | Molina et al. |
| 2007/0235091 A1 | 10/2007 | Granot |

OTHER PUBLICATIONS

Standard Store website showing ANSI/ASSE Standard 1071 requirements.
Non-final Office Action in U.S. Appl. No. 13/870,130, dated Jan. 29, 2015.
Final Office Action in U.S. Appl. No. 13/870,130, dated May 28, 2015.
Non-final Office Action in U.S. Appl. No. 13/870,130, dated Sep. 14, 2015.
Final Office Action in U.S. Appl. No. 13/870,130, dated Jan. 28, 2016.
Advisory Action in U.S. Appl. No. 13/870,130, dated Jun. 16, 2016.

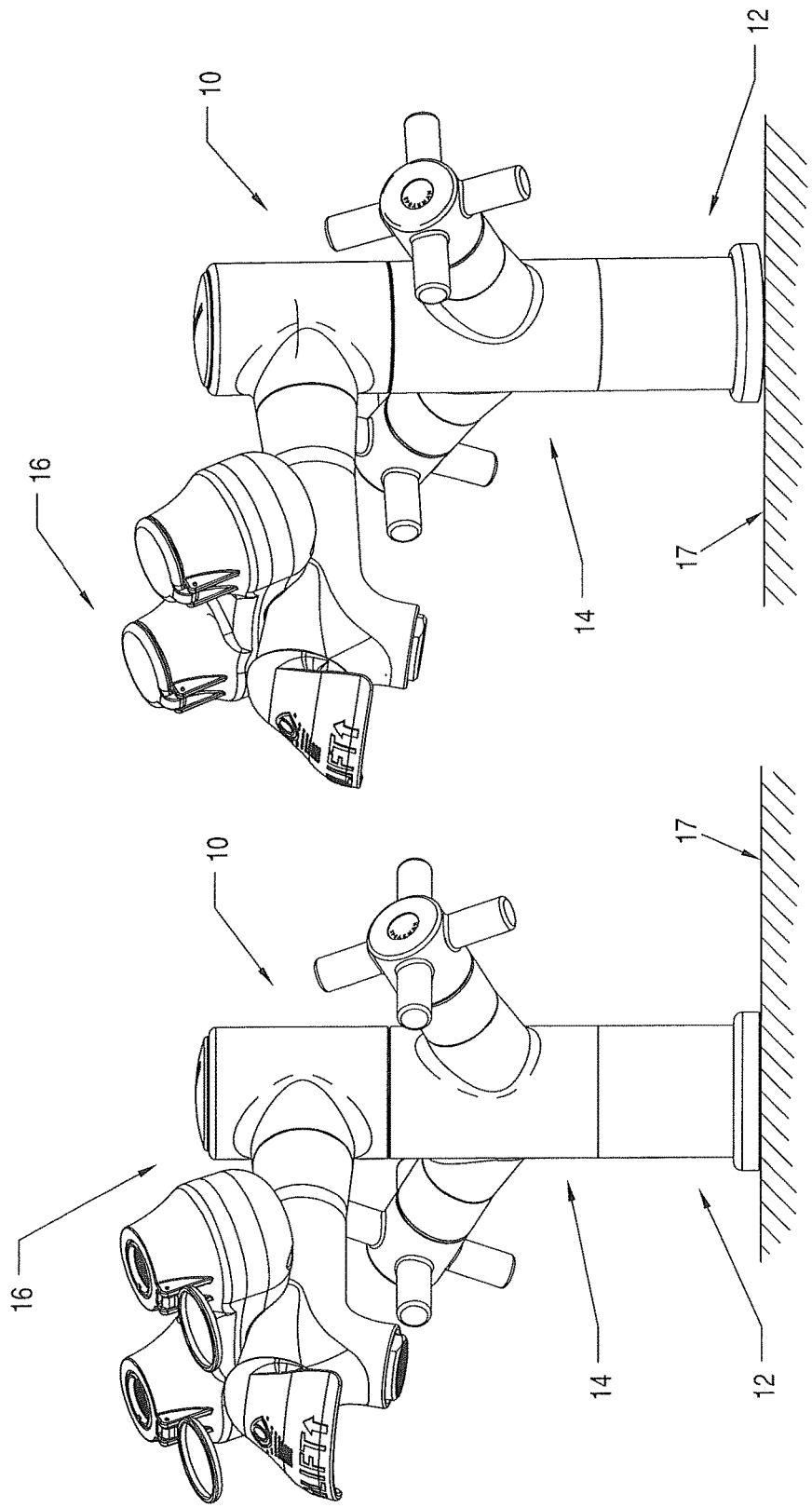

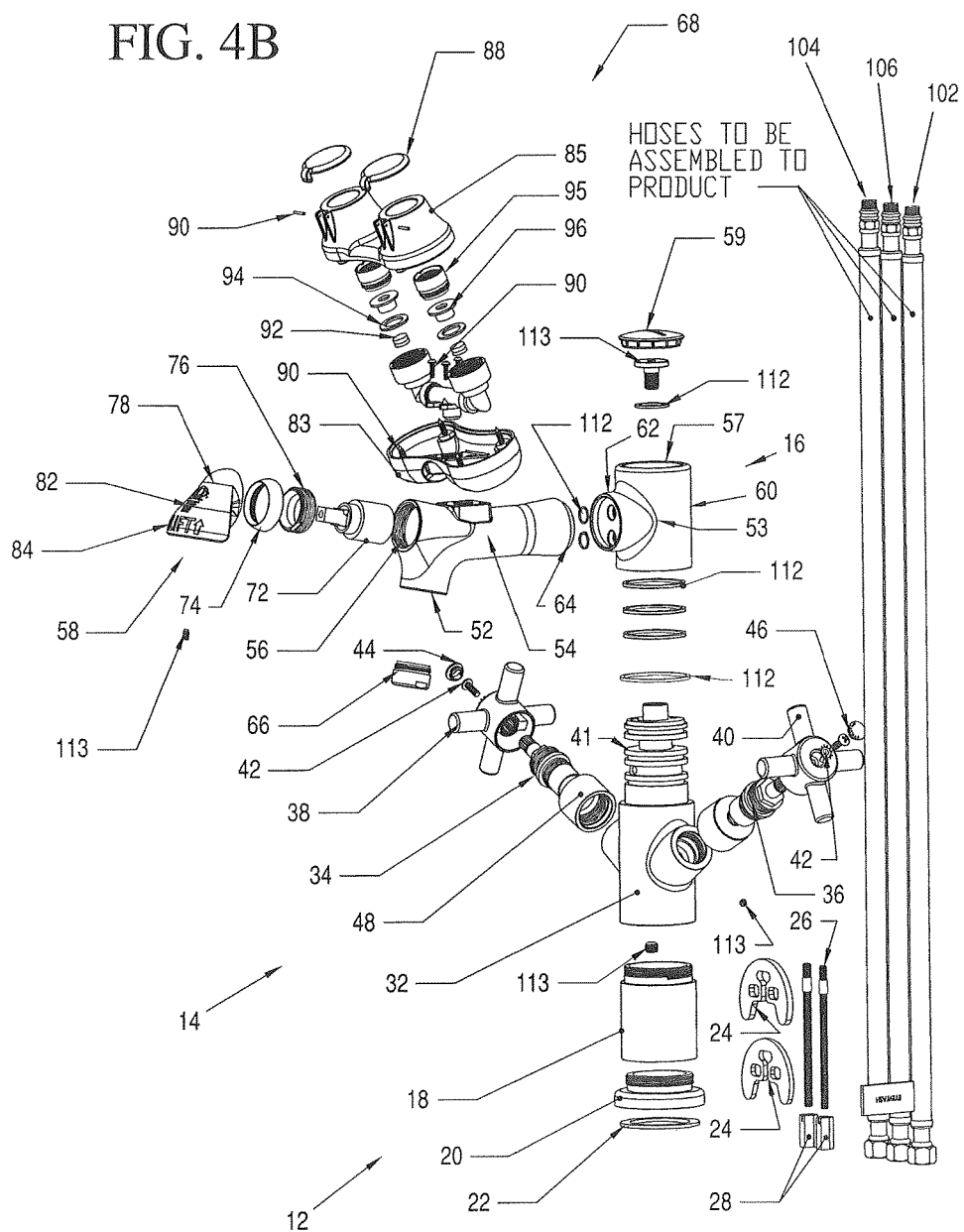

INTEGRAL EYEWASH AND FAUCET

CROSS REFERENCE TO RELATED APPLICATIONS

Divisional of U.S. application Ser. No. 13/870,130, filed Apr. 25, 2013, which claims benefit of U.S. Provisional Application No. 61/638,861 filed Apr. 26, 2012, the entire contents of each of which is incorporated herein by reference in its entirety.

BACKGROUND OF THE INVENTION

The present disclosure relates to an eyewash and integral faucet combination utilizing a common support structure but with separate water supplies to insure appropriate water flow, and water temperature, through the eyewash and faucet.

Emergency eyewash stations are mandated by governmental authorities to ensure worker safety, particularly in laboratories, factories, and warehouses where workers may have improper or accidental exposure to harmful chemicals. Conventionally, eyewash stations are positioned separately from sink faucets and require significant floor or deck space.

There are, however, several benefits to having a system which integrates an eyewash with a faucet. Various solutions have been proposed for integral eyewash and sink faucets. Each, however, has limitations. Some proposed solutions couple eyewash attachments to existing sink faucets. Such approaches create a potential risk of slow flow or minimal to zero flow to the eyewash if the water supply to the faucet is reduced or shut off. Also, such devices typically require a user to apply multiple hand movements to actuate the eyewash, which, in an emergency, may not be properly coordinated because of panic associated with the emergency. As such, these types of attachments are not suitable for industrial use. Other proposed solutions require cumbersome installation procedures and significant modification to surrounding areas and supporting structures.

Other prior art approaches to providing eyewash and faucet functions separate faucet handles from the structure supporting the eyewash. One example of such an approach is U.S. Pat. No. 6,385,794, assigned to the owner of this application. However, installation costs associated with the faucet of this patent can be substantial. For example, installation will often require extra penetrations in the deck on which handles for the faucet are mounted and extra piping connecting the faucet to the water supply. These problems are more pronounced in a typical application for the type of faucet-eyewash combination of this invention, i.e., in laboratory settings where the deck is often stone or other difficult to penetrate material. The present invention satisfies the need for an integral eyewash and faucet, utilizing a single deck penetration.

BRIEF SUMMARY OF THE INVENTION

An integral eyewash and faucet with direct connection to sources of hot and cold water provides considerable savings in time and expense of installation. Internal porting within the faucet provides independent water supply to the faucet and the eyewash. The eyewash is directly, and separately, supplied with water from the cold, or tempered, water supply utilizing an internal water passageway separate from those supplying the faucet. The latter is supplied by water whose temperature is controlled by hot and cold water faucets mounted on columnar posts of the integral eyewash and faucet. The functions of this integral eyewash and faucet can be further expanded by adding a water fountain (e.g. a bubbler) to the cold water line otherwise used to supply the eyewash.

DESCRIPTION OF THE DRAWINGS

The drawings described herein are for illustrative purposes only and are not intended to limit the scope of the present disclosure. In the drawings:

FIG. 1A is a left perspective view of an eyewash-faucet system;

FIG. 1B is another left perspective view of the eyewash-faucet system shown in FIG. 1A;

FIG. 4B is another exploded perspective view of the eyewash-faucet system shown in FIG. 1B;

DETAILED DESCRIPTION OF THE INVENTION

Figure 1C:
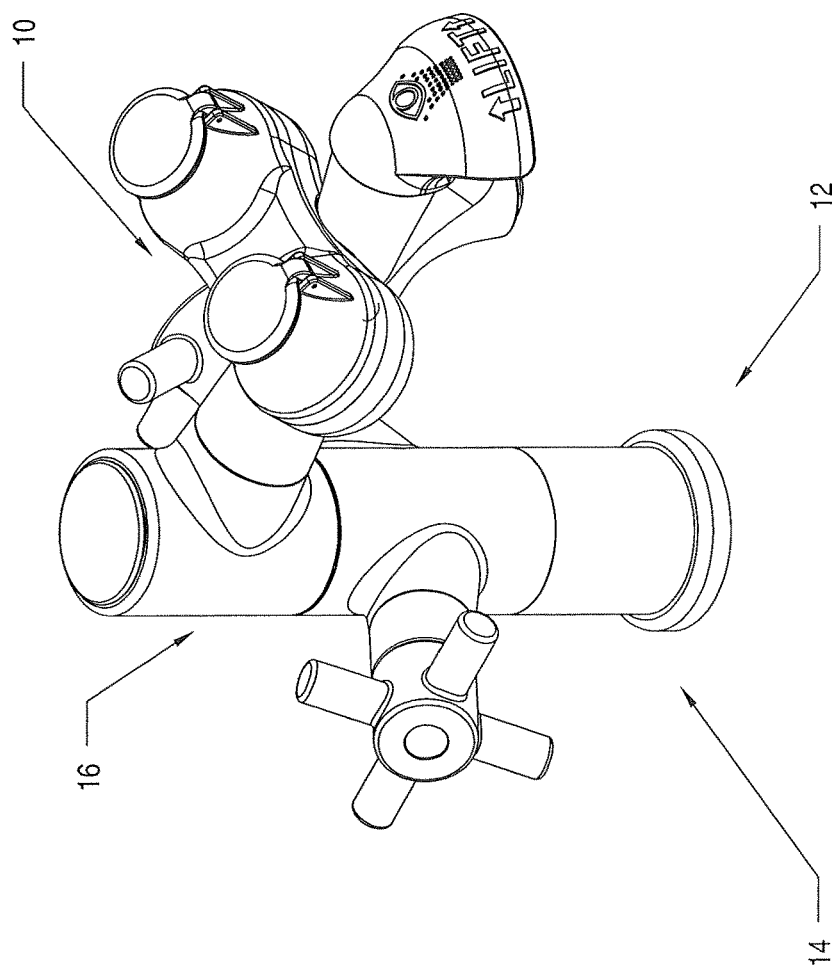
FIG. 1C is a right perspective view of the eyewash-faucet system shown in FIG. 1A.
Figure 2A:
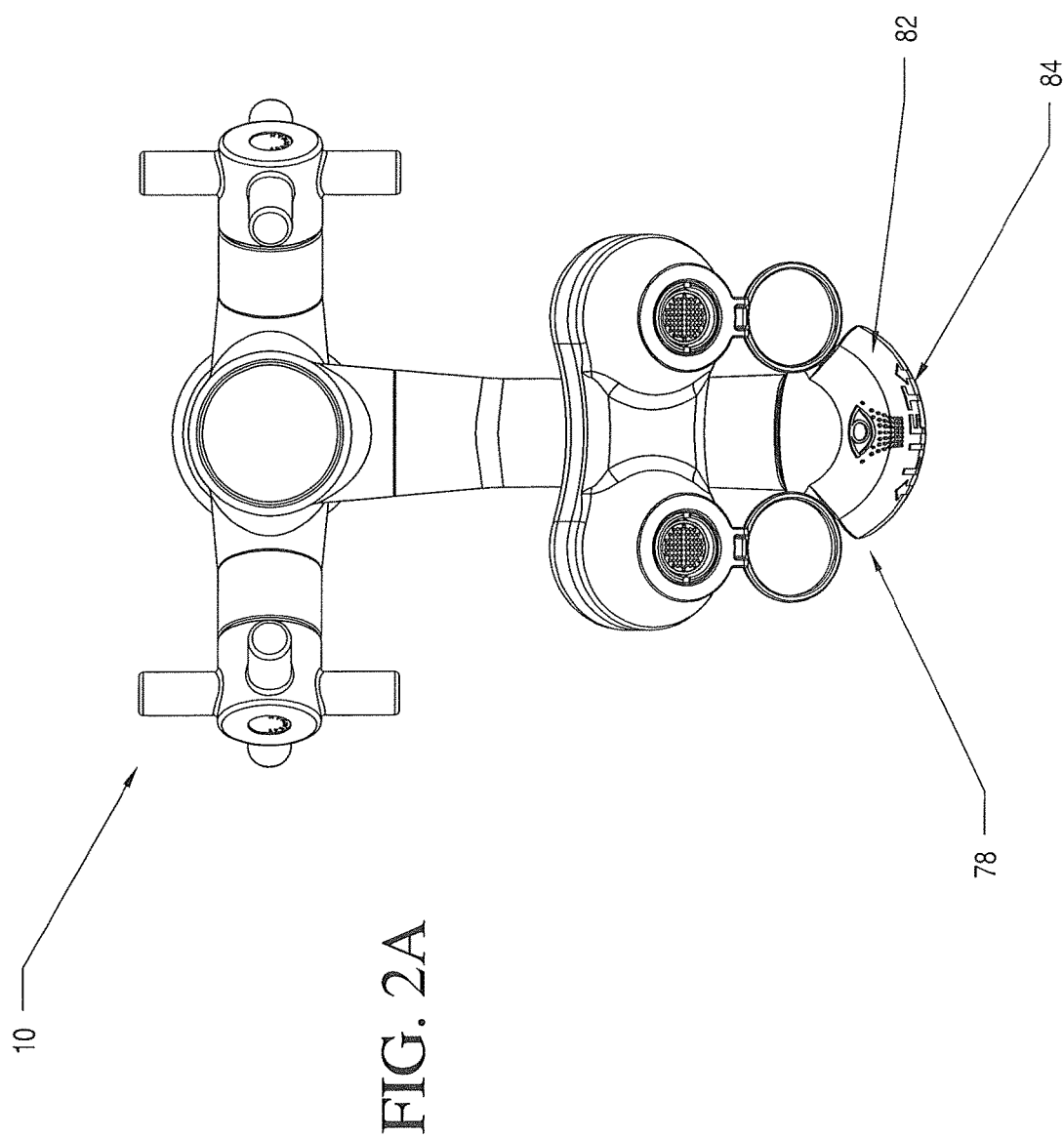
FIG. 2A is a top perspective view of the eyewash-faucet system shown in FIG. 1A with eyewash dust covers in an open position.
Figure 2B:
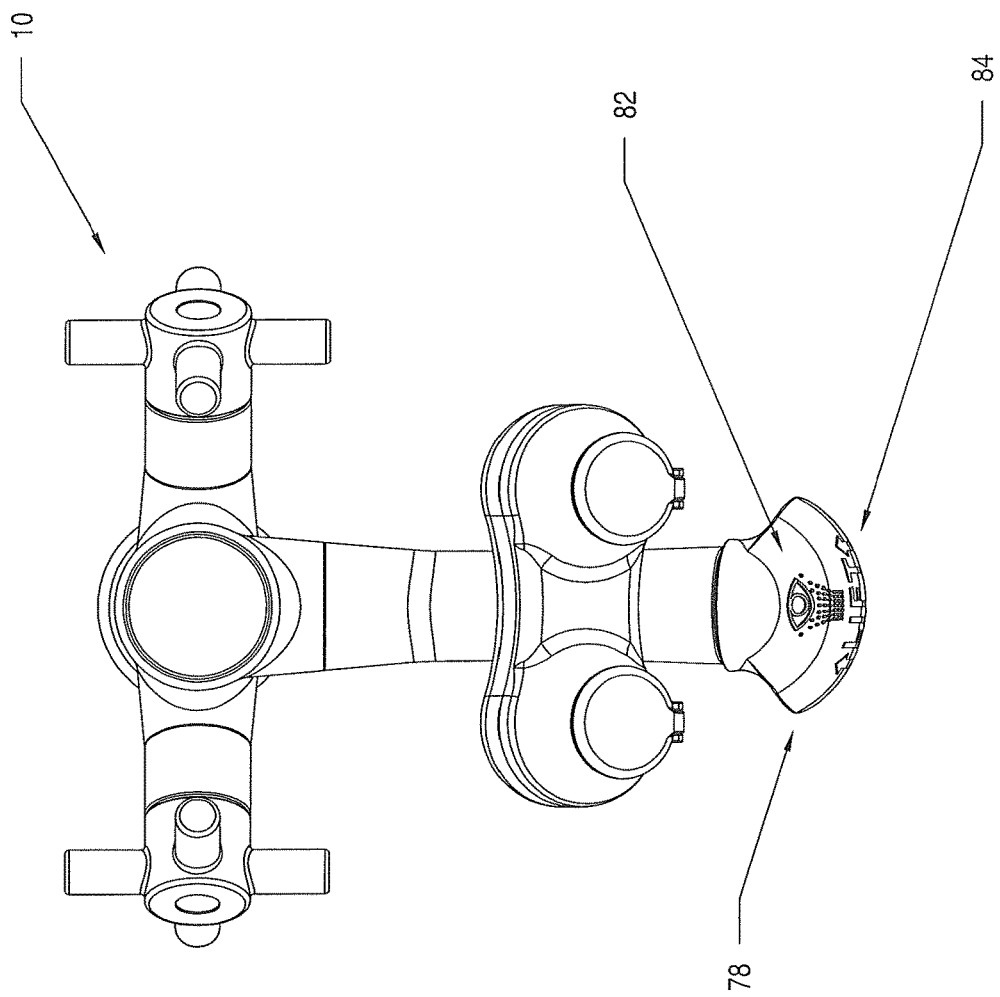
FIG. 2B is a top perspective view of the eyewash-faucet system shown in FIG. 1B with eyewash covers in a closed position.

FIGS. 1-10 show various views of an integral eyewash-faucet system 10, having a modular mount assembly 12, an above-deck valve assembly 14, and a combination spout and valve assembly 16. These assemblies are stacked on one another to form a columnar structure. The system components are mostly positioned above deck 17, where a deck is broadly defined as a support surface, such as a countertop or sink body. Because all operational components are in a single columnar structure, only one deck penetration is needed to mount system 10 to deck 17.

As previously explained, the single deck penetration used to install the instant eyewash-faucet combination has economic advantages over other combinations that require multiple deck penetrations. Included within the overall system 10 are passageways, as further described below, which facilitate fluid communication from hot and cold water sources (not shown) to multiple water outlets. The outlets may be configured in various ways such that they are suitable for use as a faucet, eyewash, drinking spout, and/or other types of water dispensing means. Where an eyewash is included, the system is configured with passageways which preclude hot water from reaching the eyewash. This arrangement prevents damage to the eyes of a user that would otherwise result if hot water reached the eyewash.

Figure 4A:
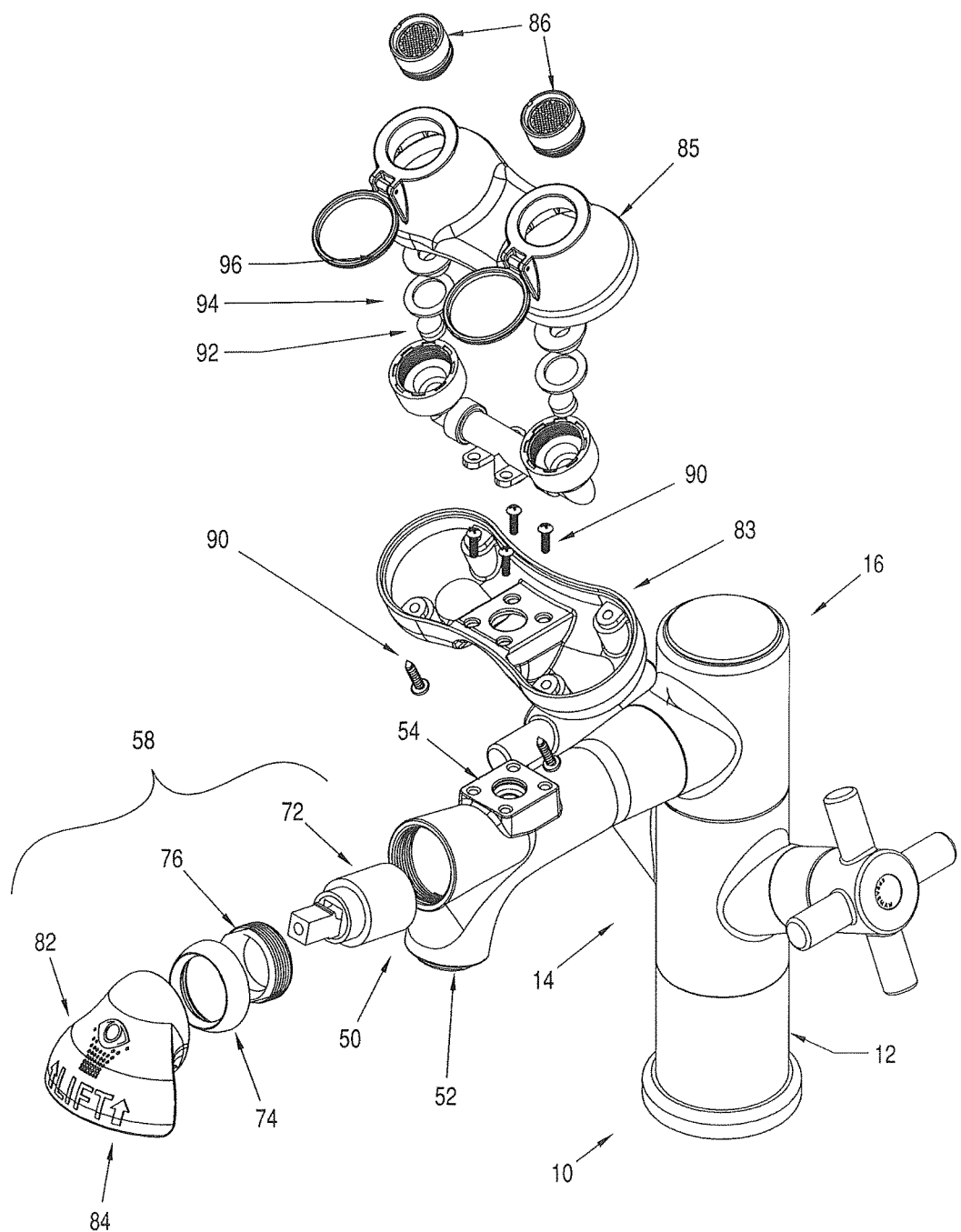
FIG. 4A is a partially exploded perspective view of the eyewash-faucet system shown in FIG. 1B.
Figure 5:
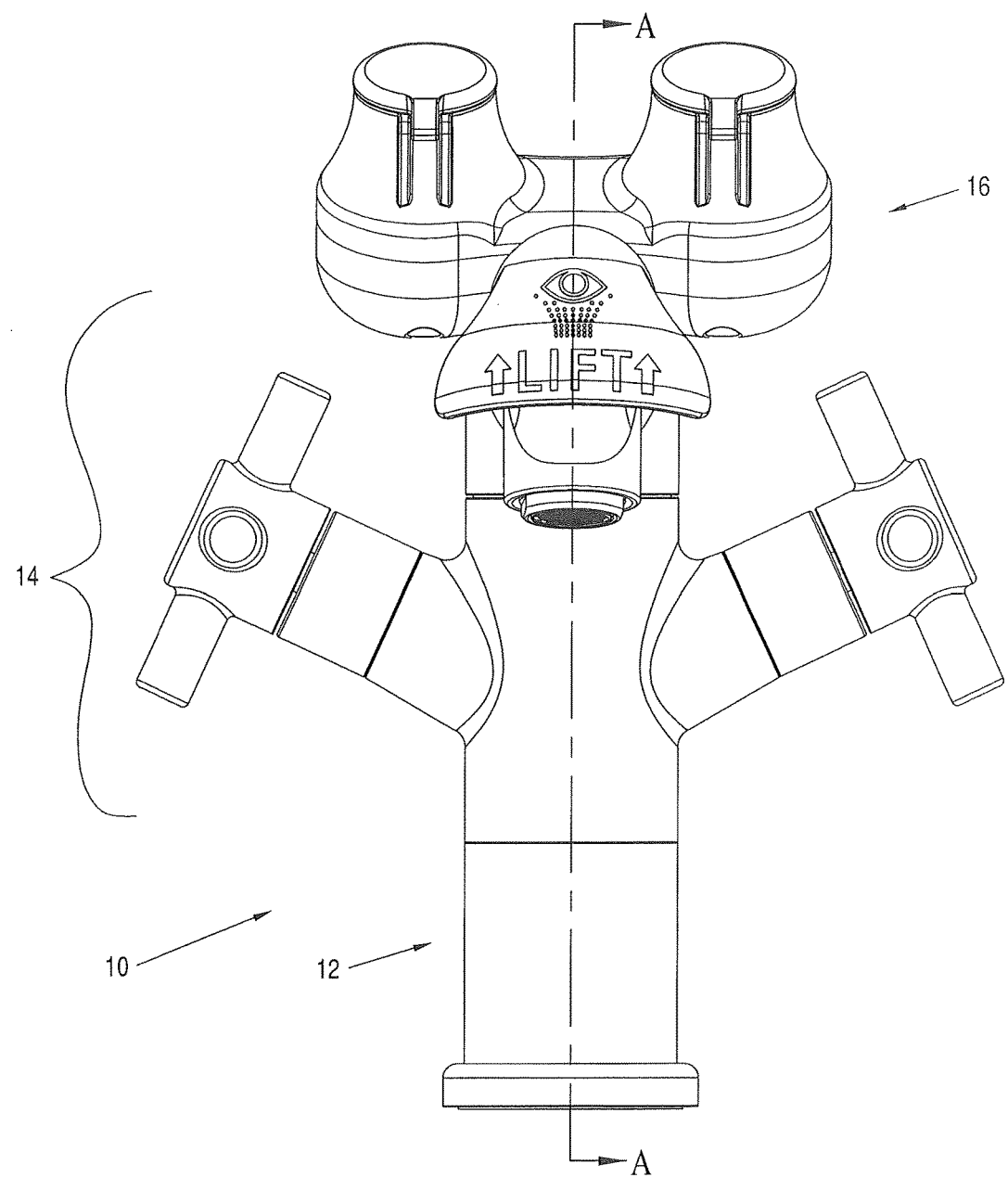
FIG. 5 is a front view of the eyewash-faucet system.

FIGS. 4A and 4B are exploded views of the eyewash-faucet system 10. The system generally includes three separate sections: (1) a modular mount assembly 12, (2) an above-deck valve assembly 14, and (3) an eyewash spray head and valve assembly 16. These assemblies are stacked one upon another to form the single columnar-like structure with a single-hole mount to facilitate passage of hot and cold water feeds to the system 10 by utilizing a single penetration in the deck or, at most, multiple small penetrations that are cumulatively no larger than the diameter of the modular mount assembly 12.

In one configuration, as shown particularly in FIG. 4B, the modular mount assembly 12 includes a mount body 18, a flange base 20, and a flange washer 22. When mounted to a deck 17 (FIG. 6B), the flange washer 22 is positioned under the flange base 20. The mount body 18 and the flange base 20 are configured for threadable engagement. Alternatively, the mount body and the flange base may be unitary.

Alternatively, the assemblies may be coupled to a deck using mount washers 24, mounting rods 26, and mounting nuts 28. The mount washers 24 are provided with thru-holes for the mounting rods 26. The washers 24 and rods 26 are positioned within the coupled mount body and flange base such that the mount assembly 12 is substantially secured to a deck. Within the mount assembly 12 is a chamber 30 (FIGS. 3, 6A, 6C, and 8) through which water supply conduits 102, 104, 106 pass for ultimate threaded attachment to hot and cold water passageways 96, 98 and 99 in valve assembly 14 (see FIGS. 3, 6A and 6C).

The above-deck valve assembly 14 includes a valve body 32, a hot water valve cartridge 34, a cold water valve cartridge 36, a hot water handle 38, a cold water handle 40, handle fasteners 42, a hot water index 44, a cold water index 46, and handle collars 48. In combination, the assembled collars and valve body form chambers to house valve cartridges 34, 36. Each valve cartridge may be specified as a conventional ¼ turn cartridge or any other suitable cartridge that controls and selectively blocks liquid from an inlet point to an outlet point. In preferred configurations, each valve cartridge 34, 36 threadably mates respectively with handles 38, 40. An upper section 41 of the valve body 32 also mates with the eyewash spray head and valve assembly 16.

The spray head and valve assembly 16 includes a spout 50 (FIG. 4A), having a lower spout section 52, an upper spout section 54, and a handle chamber 56 that houses the spout valve cartridge 72 and handle assembly 58. The spray head and valve assembly 16 also includes a spout collar 53. Referring to FIG. 4B, the spout collar 53 includes an upper collar section 57 that mates with an index button 59, a lower collar section 60 that threadably mates with the upper section 41 of valve body 32, and a front collar section 62 that threadably mates with the rear spout section 64 of spout 50. The lower spout section 52 is configured to mate with aerator 66, while the upper spout section 54 is configured to mate with eyewash spray head assembly 68 or a water dispenser/bubbler 70, the latter being described below with reference to FIG. 10.

The handle assembly 58 includes a spout valve cartridge 72, a retainer collar 74, a retainer nut 76, and an eyewash handle 78. The cartridge 72 is configured to initiate flow of water from an internal passageway, upon application of a single force eyewash handle, such as an applied force causing lifting motion, by a user. The eyewash handle 78 preferably has a bright color, such as white, red, or yellow, and includes one or more indicia 82, 84 (See, e.g. FIGS. 2A and 2B) to indicate the purpose of the handle and the lift direction. Preferably, the cartridge 72 is configured to route cold water from a cold water source (not shown). After water flow is initiated, water will travel through the system and out of either the eyewash spray head assembly 68 or the water dispenser/bubbler 70, as further described below.

Referring to FIGS. 4A and 4B, the eyewash spray head assembly 68 includes a bottom housing 83, a top housing 85, aerators 86, caps 88, fastening elements 90, and various flow control elements. The flow control elements include a flow control conduit 92, a flow control washer 94, and a flow control adapter 95, which upon assembly facilitate travel of water flow from the upper spout section 54 to aerators 86. The fastening elements 90 are preferably mounting screws or other suitable elements that securely couple the eyewash spray head assembly 68 to spout 50. In the configurations shown, caps 88 are hingedly coupled to the top housing 85 such that dust and other contaminants do not build up on aerators 86 over time. The caps may also include cap indicia which indicate the purpose of the eyewash spray head assembly and/or other features of the system.

Integration of valving controlling flow of water through the eyewash-faucet system 10 is, as discussed above, an important feature of this invention. Such integrated valving must remain as readily accessible to the user after the integration as it was with prior art devices where the valving was deck mounted. Integration of this valving, however, presents unique design and placement problems which were resolved as described in more detail below.

One problem with integration of valving is routing separate water passageways for the eyewash (or bubbler 70) and the water spout 52 within the close confines of the above-deck valve assembly 14 and spout and valve assembly 16. For safety reasons, i.e., potential scalding of eyes bathed by eyewash spray head assembly 68, hot water passageways cannot, under any circumstance connect with the eyewash.

Another challenge in the design of the subject eyewash-faucet system 10 is the physical placement of hot and cold water valving within the columnar structure of the integral eyewash-faucet system 10. To facilitate placement of valving and fluid passageways in valve body 32 (FIG. 3), the axes 31, 33 of valves 34 and 36 are oriented at an acute angle to the central vertical axis β of the valve assembly 14, preferably of about 65°. These valves advantageously intersect vertical hot and cold water inlets at about a 65° angle (see FIG. 3). Preferably ¼ turn ceramic cartridges are used in valves 34 and 36. These features minimize the volume within valve body 32 taken up by valving. Internal area within the valve body consumed by water passageways is minimized as described below.

Figure 3:
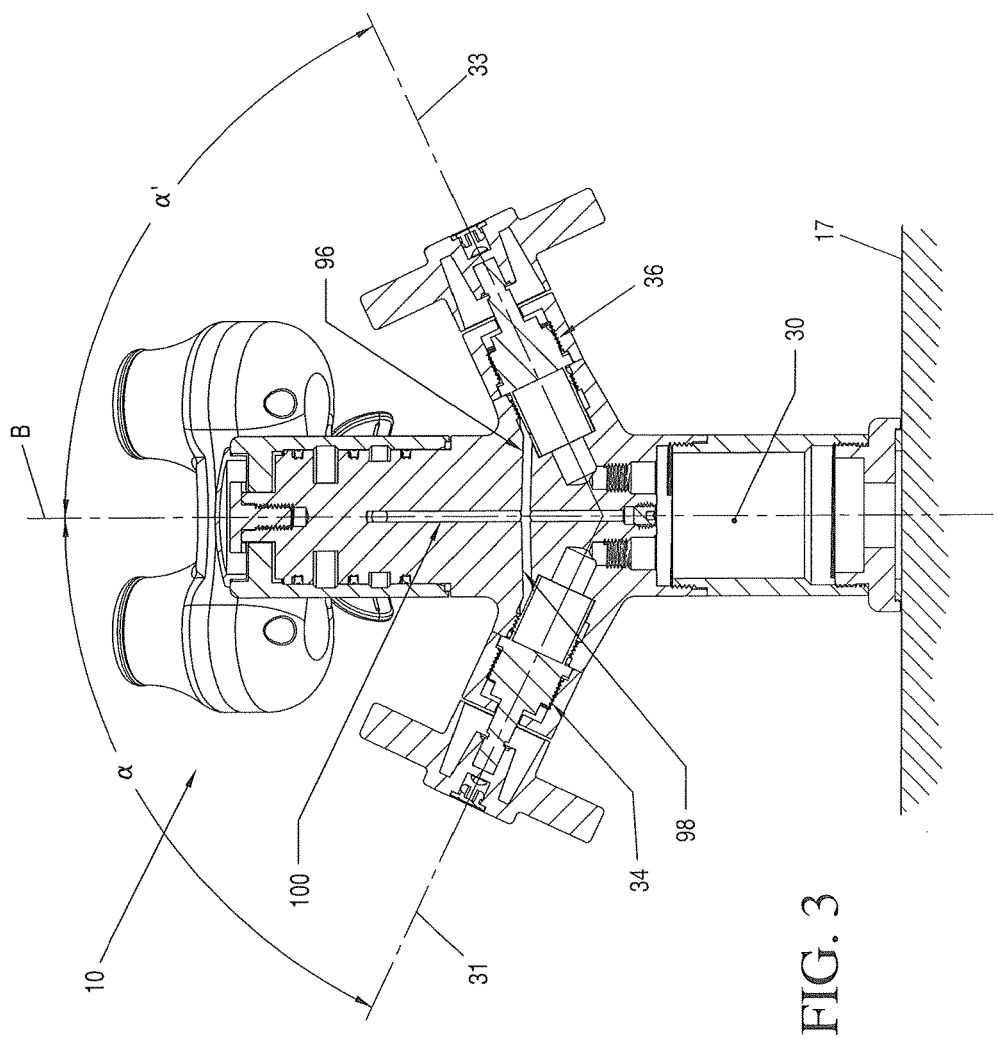
FIG. 3 is a partial sectional view of the eyewash-faucet system shown in FIG. 1B illustrating internal passageways.
Figures 6A, 6B:
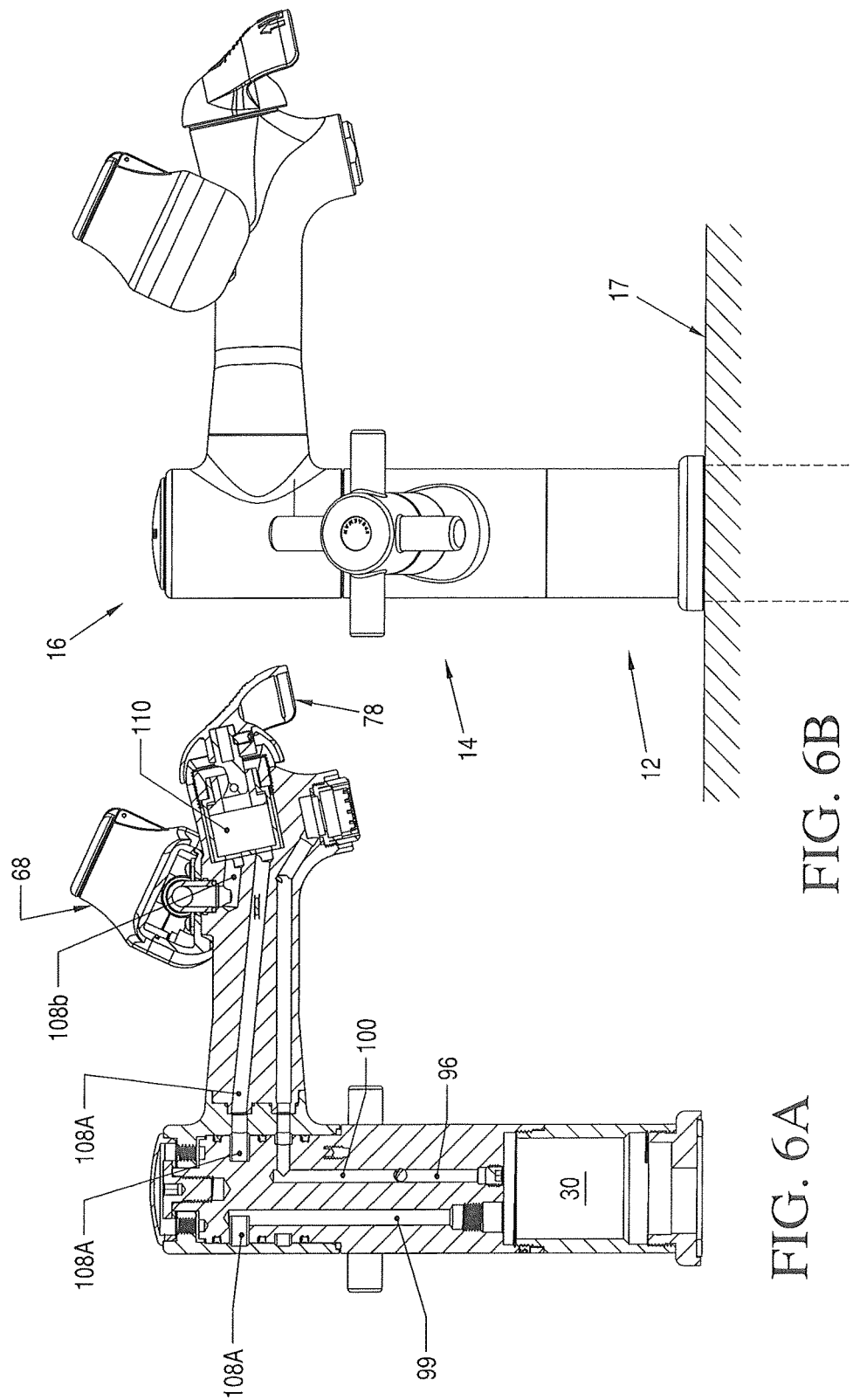
FIG. 6A is a cross-sectional right side view of the eyewash-faucet system shown in FIG. 5 taken along line A-A of FIG. 5, illustrating internal water passageways.
FIG. 6B is a left side view of the eyewash-faucet system shown in FIG. 5, illustrating internal water passageways.
Figure 6C:
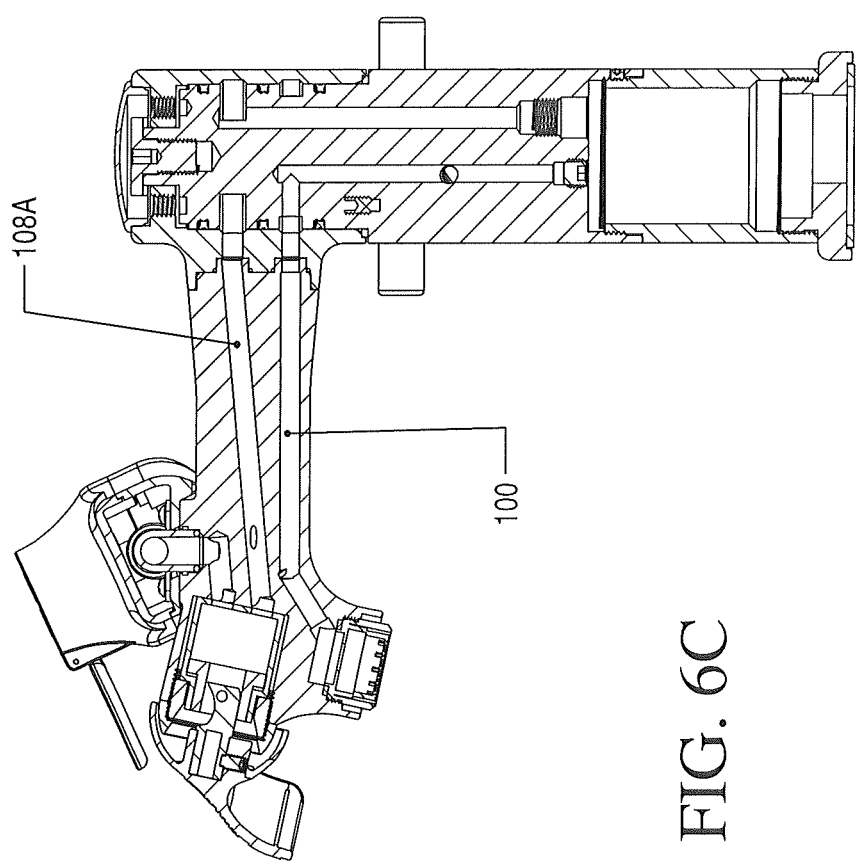
FIG. 6C is a right cross-sectional side view of an eyewash-faucet system, illustrating internal water passageways.
Figure 7:
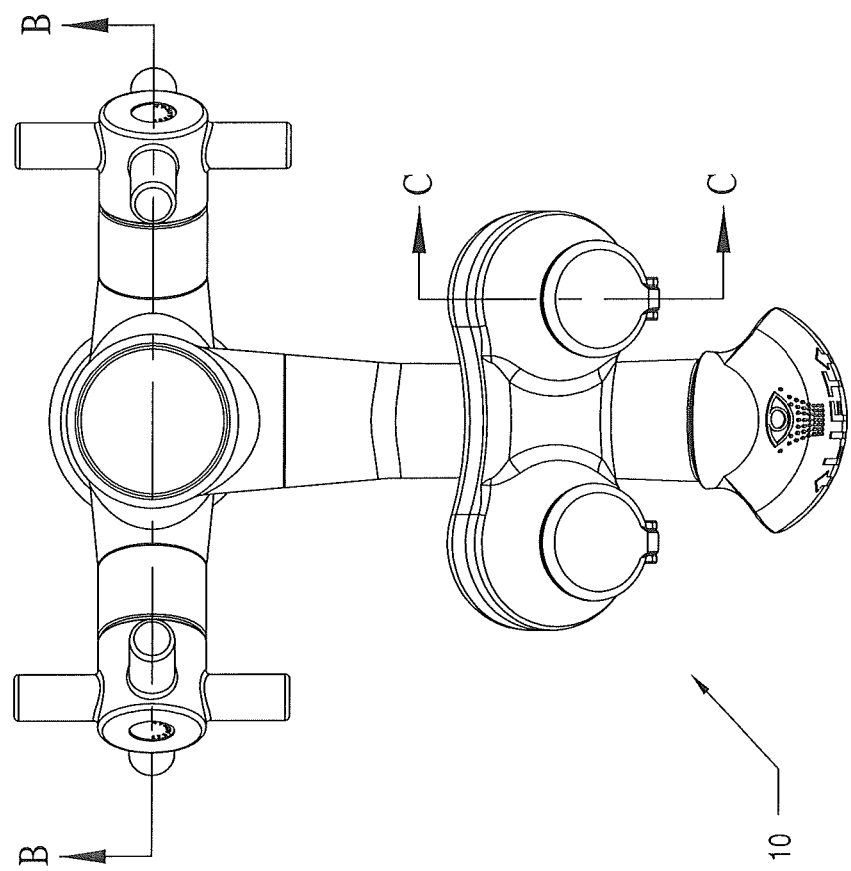
FIG. 7 is a top view of the eyewash-faucet system shown in FIG. 5.
Figure 9:
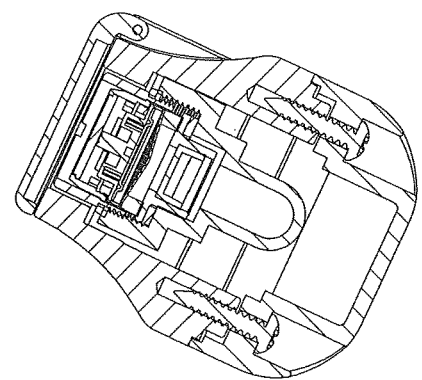
FIG. 9 is a cross-sectional view of a portion of the eyewash-faucet system shown in FIG. 7 taken along line C-C of FIG. 7.
Figure 8:
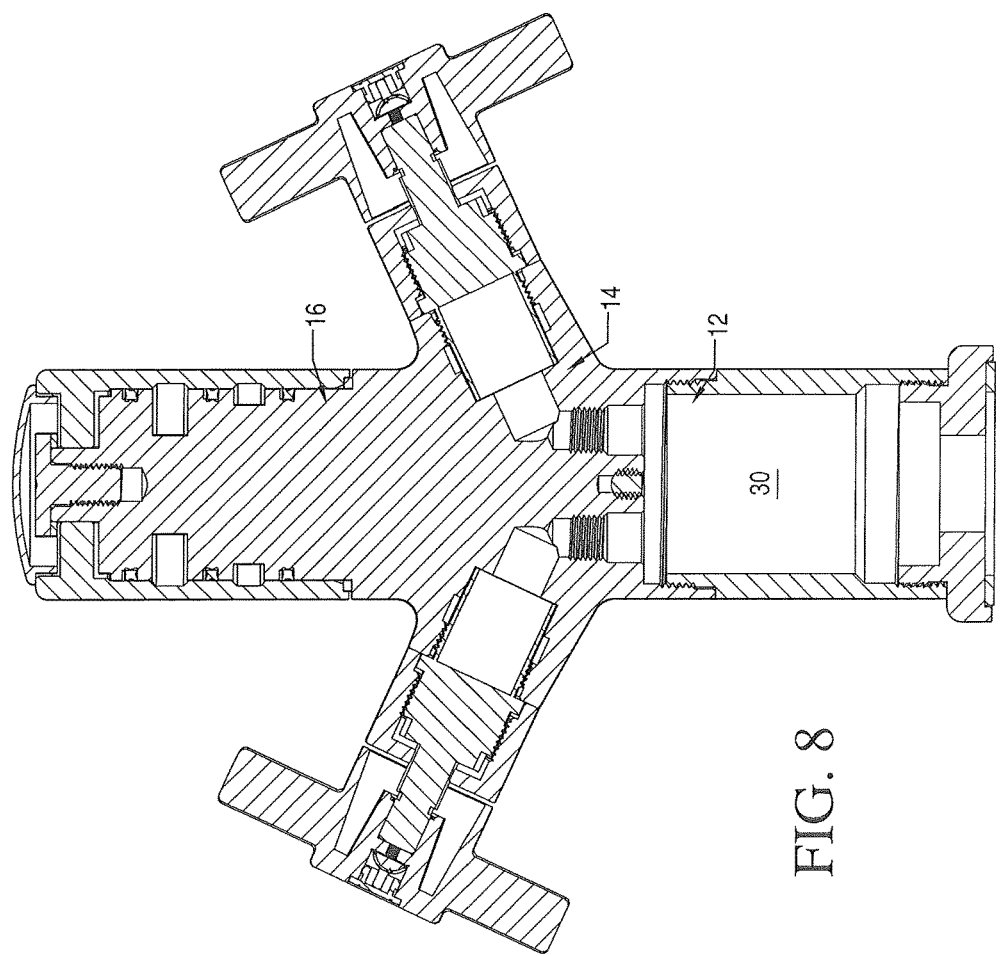
FIG. 8 is a cross-sectional view of the eyewash-faucet system shown in FIG. 7 taken along line B-B of FIG. 7.

As particularly shown in FIGS. 3 and 6A, upon assembly, the eyewash-faucet system 10 includes a cold water passageway 96, a hot water passageway 98, and mixing passageway 100 which allow water travel to the lower spout section 52. These passageways are coupled to conduits 102, 104, which are positioned in chamber 30 such that installation of the system is relatively simple. Upon turning hot and cold water handles 38, 40, a user can therefore initiate flow of cold water through cold water passageway 96 and hot water through hot water passageway 98. Where both hot and cold water flow is initiated, flowing water is mixed in mixing passageway 100 such that warm water exits from lower spout section 52. Thus, a user may manipulate the release of hot and cold water in a conventional manner to provide water flow (cold, hot, or cold/hot mixture).

Alternatively, the passageways for cold and hot water and mixing passageways can be formed from tubing within a relatively hollow version of the columnar structure of the eyewash-faucet system 10 (not shown). Like the embodiment illustrated in the drawings separate tubing would connect the source of cold water with the eyewash to prevent scalding the eyes of an eyewash user.

With respect to the eyewash spray head assembly, upon lifting the eyewash handle 78 an eyewash valve 110 is opened which initiates cold water flow from a separate conduit 108 connected to cold water passageway 99. As shown in FIG. 6A, cold water passageway 99 extends to couple with a conduit 108, having two sections 108a and 108b. Water then flows through eyewash valve 110 such that water is released from the eyewash spray head assembly 68.

Sealing elements 112 such as o-rings, quad rings, and various other types of gaskets may be disposed within the system to prevent exiting of water during use. Also, various types of fastening elements 113 may be disposed within the system to secure respective components to each other and to the deck.

Figure 10:
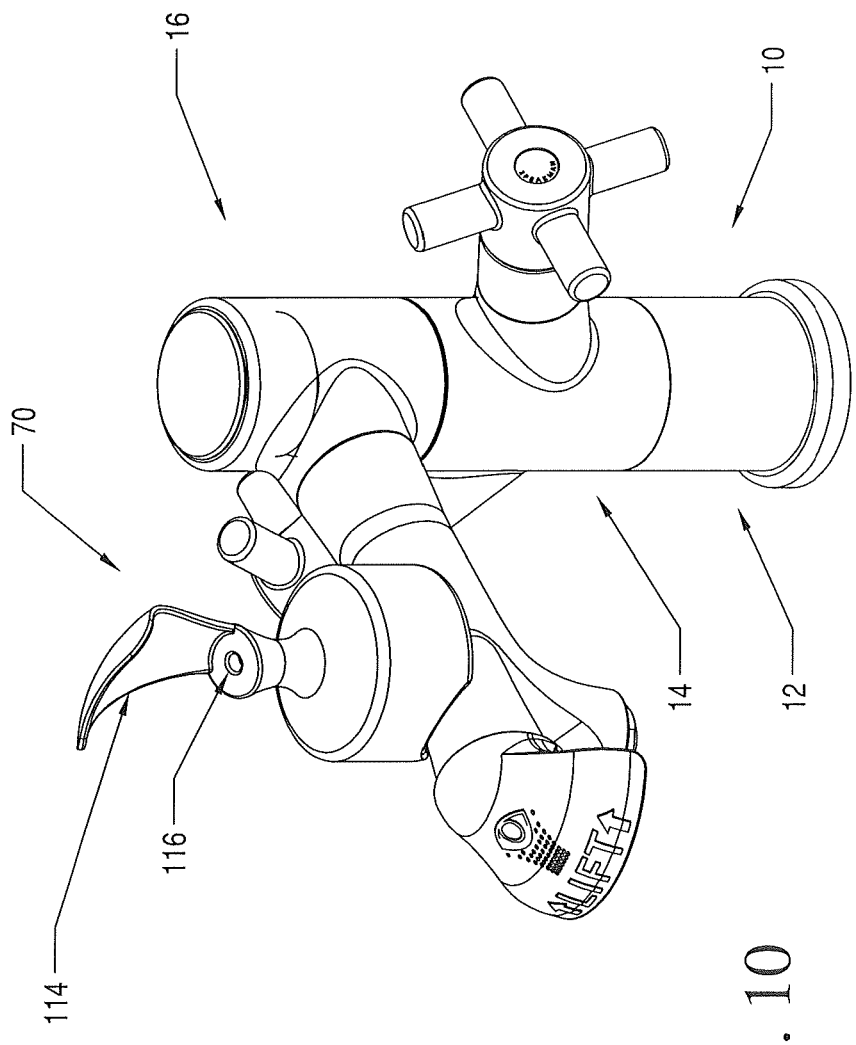
FIG. 10 is a perspective view of an eyewash-faucet system having an optional cold water dispenser/bubbler.

FIG. 10 shows an optional configuration of the system, where a water dispenser/bubbler 70 or other type of water dispensing system may be coupled to the upper spout section 54 instead of an eyewash assembly. Such an arrangement provides flexibility. The water dispenser/bubbler 70 may include a cover 114 or other device that controls the flow of water from a water source to the water dispenser outlet 116. The water dispenser/bubbler may have any configuration such that its positioning over the upper spout section is substantially aligned with the contour of the spout 50.

As used herein cold water is meant to include water from a cold water source that is tempered with auxiliary devices attached to the cold water supply which are operated in accordance with ASSE Standard 1071, promulgated by the American National Standards Institute. Adherence to this Standard is required in some applications where very cold water flowing from an eyewash might hinder the effectiveness of the eyewash in an emergency.

Any and all materials used for any components of the system, as used herein, have sufficient resistance to corrosion from water over time. Such materials include, but are not limited to, plastic materials, brass, stainless steel, copper, etc.

While embodiments of this invention have been shown and described, it will be apparent to those skilled in the art that many more modifications are possible without departing from the inventive concepts herein. The invention, therefore, is not to be restricted, except in the spirit of the following claims.

We claim:

1. A multi-component water dispenser and faucet fixture for discharging water from multiple outlets, comprising:
 a vertically stacked columnar fixture comprising:
 (a) a first component comprising a base fixedly mounted to a surface and including at least one hot water supply conduit and multiple cold water supply conduits extending through an interior of the base, wherein the multiple cold water supply conduits comprise a first cold water supply conduit and a second cold water supply conduit,
 (b) a second component fixedly attached to and in vertical alignment above the first component including internal conduits therethrough fluidly connected to the water supply conduits in the first component, wherein the internal conduits comprise:
  (i) an internal hot water conduit fluidly connected to the at least one hot water supply conduit in the first component;
  (ii) a first internal cold water conduit fluidly connected to the first cold water supply conduit in the first component; and
  (iii) a second internal cold water conduit fluidly connected to the second cold water supply conduit in the first component, and
 wherein valves controlling flow through the first internal cold water conduit and the internal hot water conduit extend from a periphery of the second component, and
 (c) a third component fixedly attached to and in vertical alignment above the second component, with the third component having both a lower faucet and an upper water dispenser mounted thereon and having passageways therein connecting: (i) the internal hot water conduit and the first internal cold water conduit in the second component to the lower faucet; and (ii) the second internal cold water conduit in the second component to the upper water dispenser,
 wherein separate actuators on the upper water dispenser and lower faucet are used to initiate flow of cold water through the upper water dispenser and flow of water through the lower faucet at a temperature selected by actuation of the valves on the second component.

2. The fixture of claim 1, wherein the valves in the second component extend from the periphery of the second component at an acute angle to a vertical axis the of assembled first, second, and third components.

3. The fixture of claim 1, wherein the first, second, and third components are circular in cross-section and have substantially similar diameters.

4. The fixture of claim 1, wherein the valves in the second component include ceramic cartridges to control flow of water through the first internal cold water conduit and the internal hot water conduit.

5. The fixture of claim 4, wherein the valves in the second component include ¼ turn ceramic cartridges to control flow of water through the first internal cold water conduit and the internal hot water conduit.

6. The fixture of claim 1, wherein the upper water dispenser is a bubbler-type water dispenser.

7. The fixture of claim 1, further comprising one or more auxiliary valves attached to the second cold water supply conduit, the second internal cold water supply conduit, or both, wherein the auxiliary valves temper water in accordance with ASSE Standard 1071.

8. A multi-component bubbler and faucet fixture for discharging water from multiple outlets, comprising:
 a vertically stacked columnar fixture comprising:
 (a) a first component comprising a base fixedly mounted to a surface and including at least one hot water supply conduit and multiple cold water supply conduits extending through an interior of the base, wherein the multiple cold water supply conduits comprise a first cold water supply conduit and a second cold water supply conduit,
 (b) a second component fixedly attached to and in vertical alignment above the first component including internal conduits therethrough fluidly connected to the water supply conduits in the first component, wherein the internal conduits comprise:

(i) an internal hot water conduit fluidly connected to the at least one hot water supply conduit in the first component;
(ii) a first internal cold water conduit fluidly connected to the first cold water supply conduit in the first component; and
(iii) a second internal cold water conduit fluidly connected to the second cold water supply conduit in the first component, and
wherein valves controlling flow through the first internal cold water conduit and the internal hot water conduit extend from a periphery of the second component, and
(c) a third component fixedly attached to and in vertical alignment above the second component, with the third component having both a faucet and a bubbler mounted thereon and having passageways therein connecting: (i) the internal hot water conduit and the first internal cold water conduit in the second component to the faucet; and (ii) the second internal cold water conduit in the second component to the bubbler,
wherein separate actuators on the bubbler and faucet are used to initiate flow of cold water through the bubbler and flow of water through the faucet at a temperature selected by actuation of the valves on the second component.

9. The fixture of claim 8, wherein the valves in the second component extend from the periphery of the second component at an acute angle to a vertical axis of the assembled first, second, and third components.

10. The fixture of claim 8, wherein the first, second, and third components are circular in cross-section and have substantially similar diameters.

11. The fixture of claim 8, wherein the valves in the second component include ceramic cartridges to control flow of water through the first internal cold water conduit and the internal hot water conduit.

12. The fixture of claim 11, wherein the valves in the second component include ¼ turn ceramic cartridges to control flow of water through the first internal cold water conduit and the internal hot water conduit.

13. A multi-component, vertically stacked columnar bubbler and faucet fixture for discharging water from multiple outlets, comprising:
(a) a first component comprising a base fixedly mounted to a surface and including at least one hot water supply conduit and multiple cold water supply conduits extending through an interior of the base, wherein the multiple cold water supply conduits comprise a first cold water supply conduit and a second cold water supply conduit,
(b) a second component fixedly attached to and in vertical alignment above the first component including internal conduits therethrough fluidly connected to the water supply conduits in the first component, wherein the internal conduits comprise:
(i) an internal hot water conduit fluidly connected to the at least one hot water supply conduit in the first component;
(ii) a first internal cold water conduit fluidly connected to the first cold water supply conduit in the first component; and
(iii) a second internal cold water conduit fluidly connected to the second cold water supply conduit in the first component, and
wherein valves controlling flow through the first internal cold water conduit and the internal hot water conduit extend from a periphery of the second component at an acute angle to a vertical axis of the assembled first component and second component, and
(c) a third component fixedly attached to and in vertical alignment above the second component, with the third component having both a faucet and a bubbler mounted thereon and having passageways therein connecting: (i) the internal hot water conduit and the first internal cold water conduit in the second component to the faucet; and (ii) the second internal cold water conduit in the second component to the bubbler,
wherein separate actuators on the bubbler and faucet are used to initiate flow of cold water through the bubbler and flow of water through the faucet at a temperature selected by actuation of the valves on the second component.

* * * * *